United States Patent [19]
Aidlin et al.

[11] 3,831,738
[45] Aug. 27, 1974

[54] BOTTLE ORIENTATION APPARATUS

[75] Inventors: Samuel S. Aidlin, Brooklyn; Stephen H. Aidlin, Valley Stream; Melvin Hartzog, Brooklyn; John C. Shepard, Jamaica, all of N.Y.

[73] Assignee: Aidlin Automation Incorporated, New York, N.Y.

[22] Filed: Aug. 1, 1973

[21] Appl. No.: 384,517

[52] U.S. Cl........ 198/33 AC, 198/33 R, 198/33 AB
[51] Int. Cl............................................. B65g 47/24
[58] Field of Search......... 198/33 R, 33 AB, 33 AC, 198/33 AD

[56] References Cited
UNITED STATES PATENTS

| | | | |
|---|---|---|---|
| 1,190,235 | 7/1916 | Ayars | 198/33 AC |
| 2,857,039 | 10/1958 | Whitecar | 198/33 AC |
| 2,953,237 | 9/1960 | Whitecar | 198/33 AC |
| 3,144,740 | 8/1964 | Erickson et al. | 198/33 AC |
| 3,722,659 | 3/1973 | Aidlin et al. | 198/33 AC |

Primary Examiner—Evon C. Blunk
Assistant Examiner—Joseph E. Valenza
Attorney, Agent, or Firm—Martin Smolowitz

[57] ABSTRACT

A bottle orientation apparatus for use with an endless conveyor belt, adapted to receive bottles in a horizontal position from a source of supply. The apparatus is provided with a pair of cooperatively acting orientators each of which is disposed on either side of the belt, and formed of two integral guide members. The bottles being conveyed are engaged at the neck by a sloping, generally elongated, first guide member so as to provide the initial uplift to the bottle. The bottle, as it is being conveyed, is next urged into contact with a second guide member having a "V" shaped opening and continuously associated wall surfaces forming a channel for the final orientation of the bottle into the erect position.

12 Claims, 4 Drawing Figures

BOTTLE ORIENTATION APPARATUS

The present invention relates to an apparatus employed in the proper orientation of bottles along a conveyor belt. More particularly, the present invention is directed to an apparatus for positive and correct orientation of bottles prior to entering the production line for subsequent handling.

The prior art has recognized correct bottle orientation and feeding as essential factors in the efficient filling of the bottles as they proceed in the production line. However, to achieve such orientation, associated apparatus tended to become somewhat complex and had numerous moving parts. For example, prior issued U.S. Pat. No. 3,722,659 discloses a bottle orientation apparatus which employs a conveyor belt that feeds empty bottles to be orientated on to an endless elevator having spaced pairs of cleats associated therewith. A plate which is centered and fixed over the conveyor belt, is disposed to clear a space provided between the cleats so as to gradually orient the bottles from a horizontal to a vertical position. Included as part of the orientation mechanism are a pair of side panels having a downwardly tapered portion disposed in proximity to the conveyor belt. Though such prior art functioned in a highly efficient manner, it was quite apparent that the multiplicity of parts added to the cost, maintenance and overall efficiency. Furthermore, the necessary floor space, set-up time and down-time were factors which contributed toward the design of the present inventive apparatus.

Accordingly, it is the principal object of the present invention to overcome the defects of the prior art.

Another object of the present invention is to provide a compact trouble-free bottle orientation apparatus suitable for use with a gravity feed supply of bottles or elevator feed of bottles as they emerge from a blow-molding machine.

Still another object of the present invention is to provide a fast and efficient bottle orientation apparatus which is simple to set up and adjust for different bottle sizes.

A further object of the present invention is to provide a bottle orientation mechanism where failure of a bottle to correctly orient itself or exit properly will not cause jamming of the apparatus.

Still a further object of the present invention is to provide a bottle orientation apparatus where cleat disposition and placement enables the bottle to exit out of the conveyor belt in a trouble-free manner.

The foregoing and other objects and advantages of the present invention will become more readily apparent to those skilled in the art from the appended drawings and foregoing description.

Figure 1:
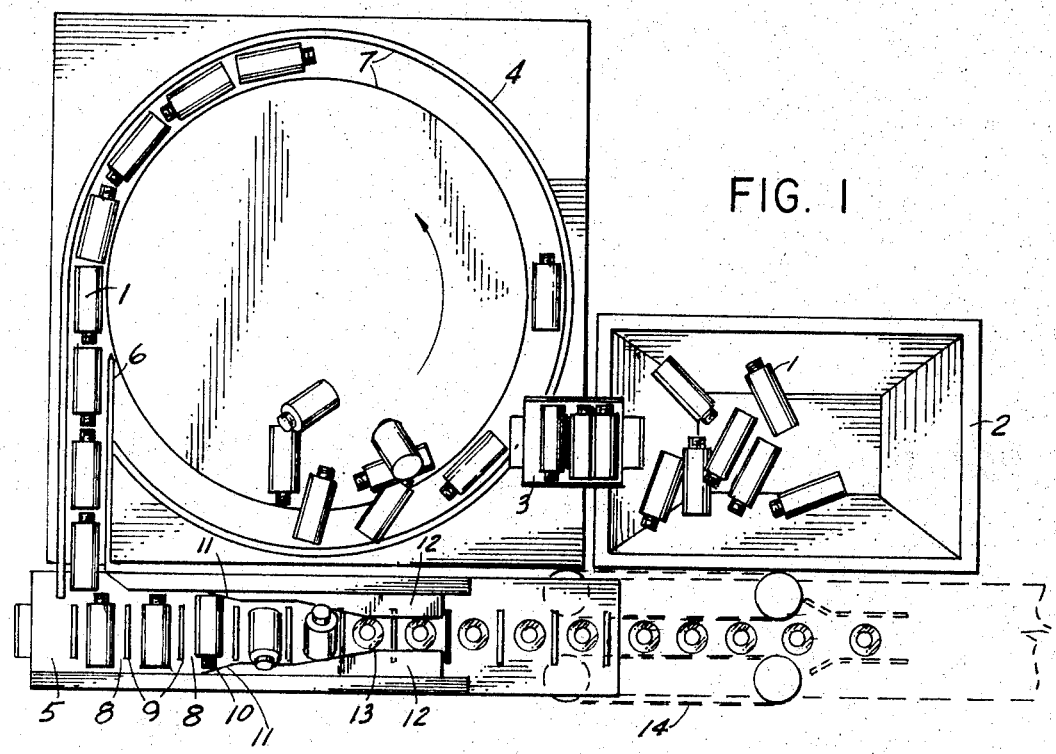
FIG. 1 is a schematic plan view illustrating the orientators and associated apparatus of the present invention.

Generally speaking, the instant invention is directed to a two stage bottle orientation device, each stage of which is in cooperative working relation with the other. As the bottle is dispensed at random from a suitable source; i.e., feed bowl, it travels and enters onto an endless belt. The bottles seat into designated positions on the belt which are defined by successively spaced integral cleats.

As the bottle passes through an escapement at the point of exit of the feeder, it starts its forward travel in a flat or horizontal position. The neck or opening at the top of the bottle may lie facing to the left or right with respect to the forward travel of the belt. Downstream in its travel, the bottle is to be placed in the vertical position, resting on its base, by means of the inventive device. The device functions anywhere along the line of travel, however, placement along the first half of the belt has proven to be effective.

The inventive device comprises a pair of orientors which are disposed along the sides of the belt edge and partially overhands the belt. Sufficient clearance is provided to avoid contact with the cleats and/or the belt so as to assure smooth and uninhibited travel of the bottle. As the bottle approaches the orientators, depending on whether its neck faces the right side or the left side of the belt, it is initially engaged by a first stage of the orientator apparatus at the bottle neck on such side. For purposes of discussion and for illustrative purposes only, the neck is assumed to be facing toward the right, obviously the apparatus is intended to function so that the same results will occur if the neck were facing the left. As the belt moves the bottle in the forward direction, a first sloping portion of the first stage orientator provides the initial upward movement for such bottle; then such bottle is engaged by a second portion (of the first stage) having even a greater slope than such first portion and this in turn provides added upward momentum to the bottle. Thereafter, as the bottle moves forward, it engages a second stage to provide still further uplift as the bottle is on the belt between a pair of cleats. Subsequently, the erect bottle passes into a slot defined by two parallel, inclined wall surfaces and then travels to a point of exit for further handling (after having been placed on its base and has come to rest in the vertical position).

Of the two orientation stages, the first stage includes an elongated member having a wall surface with a fixed sloping orientation of about 30° to the horizontal axis of the belt; whereas, the second stage comprises an adjustable pair of members which cooperate to form a V-shaped opening (in a plane inclined to the belt) and continues to form a pair of parallel wall surfaces, at a point further upstream of stage one. The second stage is adjustable in both the horizontal and vertical directions to suit different sized bottles. The partially lifted bottle is engaged by the "V" opening at a point along the major body portion of the bottle, to place it into the substantially vertical position for final orientation by the channel formed by a pair of continuous wall surfaces extending from the previously described "V" opening.

Adjustment of the two stages of the orientator is provided, for example, to correct for the overall height of the bottles. As previously mentioned, the empty bottles enter onto a conveyor belt between spaced cleats, and such cleats are made of metal or plastic. The conveyor belt is of a conventional type being of a width equal to the maximum height of the bottle. The cleats on the other hand are disposed in spaced relation along the belt equal to the largest diameter of the bottle and are integrally formed therewith. Depending on the particular bottles being handled, it remains but a simple procedure to replace one belt for another.

The principal features of the present invention are directed to a bottle orientation apparatus for use with a moving endless conveyor belt provided with integrally formed spaced cleats adapted to receive bottles having a major body portion, a neck and a base, where such bottles are disposed onto said conveyor in a generally horizontal position, said apparatus including: a pair of orientators each in parallel relation with respect to one another and affixed near the edge of said conveyor belt, each being provided with a first and a second co-acting guide means; said first guide means having a sloping working wall surface forming an abutment for contacting the neck of said bottle, causing said bottle to move in an upward direction off the surface of said conveyor belt; and second guide means integral with said first guide means having cooperating wall surfaces inclined with respect to the plane of said conveyor belt, for contacting the bottle along its major body portion, causing it to be positioned vertically on said bottle base, as it continues in its course of travel on said conveyor belt.

Also within the scope of the present invention is a first guide means wherein: said first guide means is defined by an integral elongated member having two continuous merging surfaces each of which slope at different acute angles with respect to the horizontal axis of said belt; and second guide means defined by a pair of working wall surfaces for engaging the major body portion of said bottle; the first of said surfaces being inclined inwardly and downwardly with respect to the longitudinal axis of said belt; the second surfaces being parallel to one another, inclined to the plane of said belt, and continuous with said first surfaces.

As the bottles move along in position defined by the cleats, any failure of the bottle to properly orient or exit is not fatal to continuous operation. Under such circumstances, the bottle may become crushed and continues in its travel until it falls off the conveyor line.

Referring now more specifically to the inventive apparatus schematically shown in FIG. 1, bottles (1) are drawn from a suitable source, such as, an elevator feeder (2) in random fashion through an entrance port or escapement (3) onto a rotating aligning disc or circumferential orientor (4) which rotates at a speed in concert with orienting conveyor belt (5). The bottles (1) enter onto the belt (5) in a horizontal position and are disposed in either neck right or neck left position depending upon how the bottles are received from the elevator feeder (2). The aligning disc (4) rotates in the counter clockwise direction and the bottles travel along a predetermined course defined by a channel formed by a pair of rings (7) which have an integrally defined channel (6) at a point about 180° opposite the point of entrance of the bottles onto the disc. The bottles eventually exit out of the channel (6) onto the conveyor belt (5) and into a space (8) formed by cleats (9). The conveyor belt (5) is an endless belt driven by a pair of conventional variable speed motors (not shown). From this point on, the bottles travel into the orientators which engage the bottles and tend to vertically orient them as they travel on the conveyor belt (5). At all times during this operation, the bottle remains in the space (8) defined by successive cleats (9). Depending on the size of the bottles being handled, different sized belts (5) as well as different sized cleat spacing (8) are employed. Such belts are easily removable by conventional means. The entire apparatus may rest on conventional legs, which, of course, can be varied depending on the discharge height requirement of associated equipment.

Figure 4:
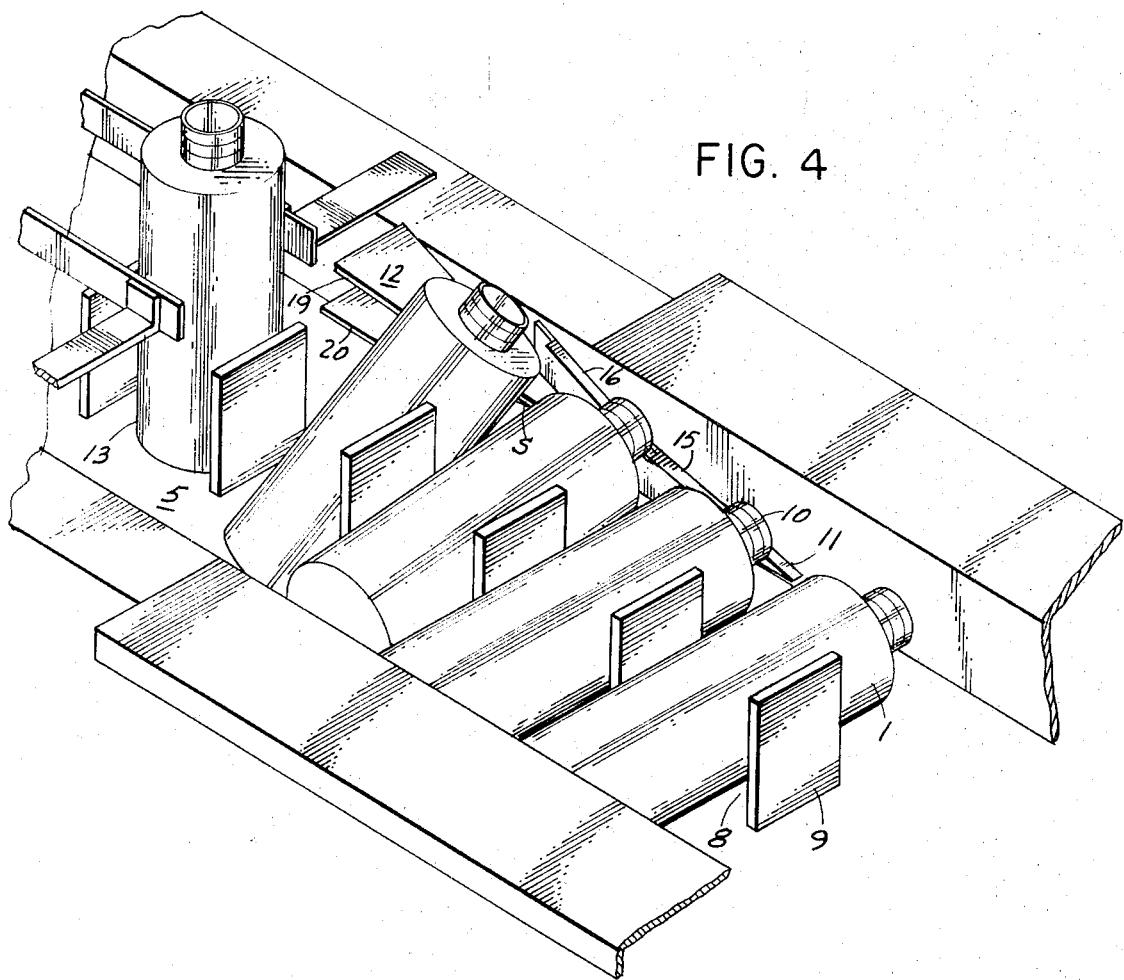
FIG. 4 is a fragmentary perspective view of the invention illustrating one of the bottle orientators shown in FIG. 2.

As the bottle (1) travels along the belt (5) it initially is engaged at its neck (10) by sloping guide panels (11). Such panels are disposed at either side of the belt (5) and are in tandum, being provided with sufficient clearance away from the sides of the belt so as not to interfere with the forward movement of conveyor belt (5). Panels (11) provide the wall surfaces, which hereafter are referred to as stage one of the orientation device. Stage one, is intended to engage the bottle neck (10) irrespective of whether the neck is facing right or left; since the panels are on either side of the belt (5) (see FIG. 4). Associated with each of the panels of stage one, is an integrally formed second stage of orientors defined by two horizontally sloping panels (12) which cooperate to form a V-shaped opening having its apex in a direction toward the forward movement of the belt (5). The bottle (1) is engaged by wall surfaces (S) of the panels (12) which serve to contact the bottle along the major body portion of the bottle. The second stage serves to place the bottle on its base and into a stable vertical position as at (13). The surfaces (S) of the panels (12) continue from the "V" formation and form two wall surfaces (19) parallel with the belt (5) and define a channel to guide the bottle (1) into the completely vertical position as such bottle continues on to transfer belt (14) and ultimately to a customer's conveyor.

Figure 2:
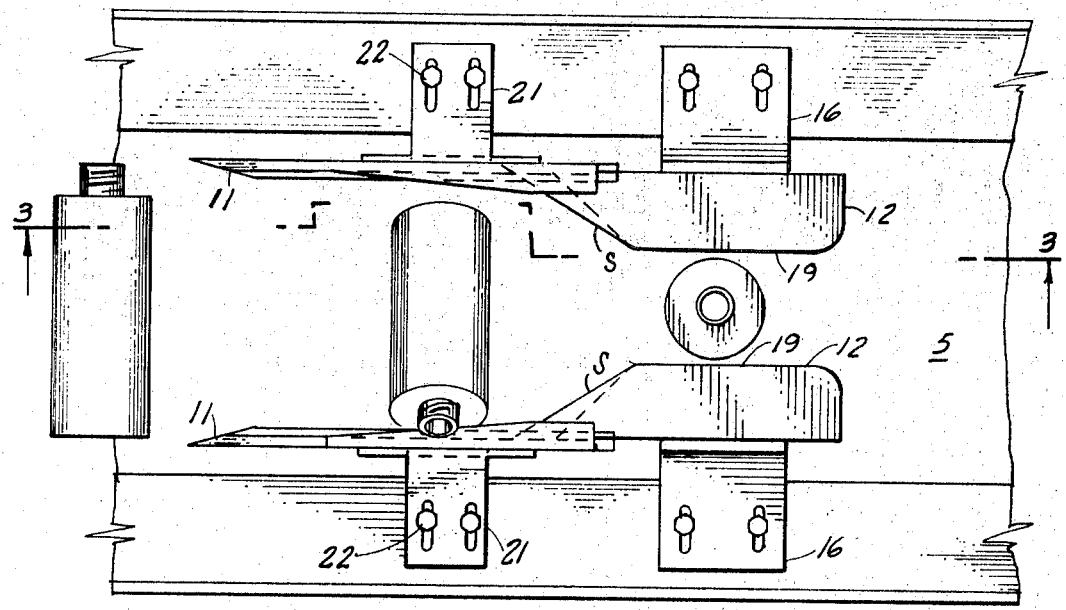
FIG. 2 illustrates a plan view of the bottle orientator assembly of the present invention.
Figure 3:
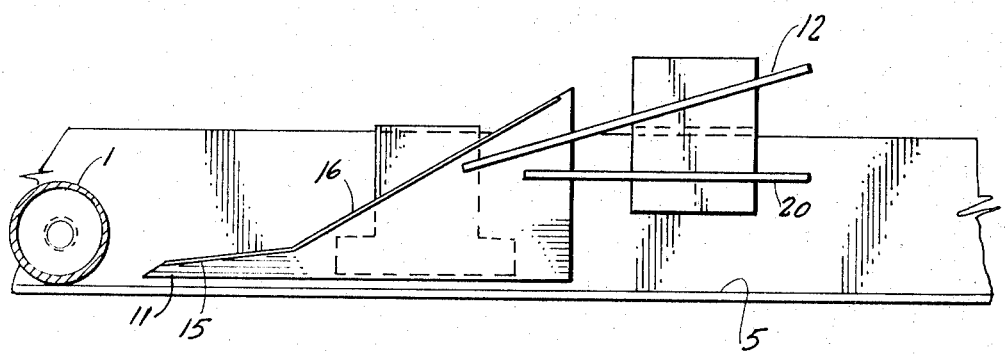
FIG. 3 illustrates the bottle orientator of FIG. 2 taken in section along 3—3.

In FIGS. 2 and 3 the two stages of the orientator and their disposition with respect to one another and belt (5), are clearly shown. Stage one of the orientator includes side panels (11) which are spaced on either side of the belt (5). Integral therewith is a slotted flange (21) which is provided with adjusting screws (22), enabling stage one to be adjusted in the horizontal direction, depending on bottle size. For the most part, the slope of stage one is maintained in fixed relation with respect to the horizontal axis of the belt. For example, a fixed slope of 30° has been found satisfactory. The forward movement of the bottle (1) on conveyor belt (5) causes the neck of the bottle to engage an integral segment (15) of panel (11). Contact of the neck along the wall surface of segment (15) causes an initial lift to the bottle (1) until it gradually passes onto a second sloping surface (16) of panel (11) (see FIG. 3). Once the bottle (1), has travelled the complete length of panel (11) it is partially lifted at a point along its major body portion. Thereafter the bottle, while in the aforementioned substantially vertical position, is caused to travel into stage two of the orientator assembly (see FIG. 4).

As can be seen from FIG. 2, stage two is in effect an extension of stage one and includes two panels (12) which are generally winged shaped. These panels (12) have associated therewith slotted flanges (16) provided with suitable clearance enabling panels (12) to be adjusted both in the vertical and horizontal directions. The degree of adjustment varies with the size of bottles being employed, as well as, operating speed of the run. The surfaces (S) of panels (12) co-act to form a V- shaped entrance enabling the substantially vertically oriented bottle to be stabilized in the erect position and come to rest on its base. Thereafter, the bottle is caused to travel in a straight line along a channel defined by parallel surfaces (19) of the panel (12). Additional support member (20) prevents the bottle (1) from in some manner falling into the space between the belt (5) and the panels (12). By adjusting stage two with respect to stage one, the present invention affords a high degree of flexibility in handling different types of bottles under variable operating parameters.

From the aforementioned description, it appears that the present inventive apparatus is exemplary in its simplicity of construction and operation. It is apparent that such machine is cheaper to construct than other machines having a more elaborate configuration. It is also apparent that this apparatus has the capacity to deliver properly oriented bottles at a high rate of speed in excess of that capable by most presently existing machines. An added advantage is the compactness of the conveyor and feeding apparatus which results in less floor space per unit. Furthermore, it should be apparent that the adjustment features of the orientor apparatus enables its use for a diverse group of differently sized bottles as compared to other bottle feeders.

It will be apparent to those skilled in the art from the preceding description, that certain changes may be made in the above invention without departing from the scope of the invention. It is intended that the descriptive matter above shall be interpreted as illustrative and in no way limiting, since all equivalents within the scope of the disclosure may be substituted and such substitution is intended.

What is claimed is:

1. A bottle orientation apparatus for use with a moving endless conveyor belt provided with integrally formed spaced cleats adapted to receive bottles having a major body portion, a neck and a base, where such bottles are disposed onto said conveyor in a generally horizontal position, said apparatus including: a pair of orientators each in parallel relation with respect to one another and affixed near the edge of said conveyor belt, each being provided with a first and a second co-acting guide means; said first guide means having a sloping working wall surface forming an abutment for contacting the neck of said bottle, causing said bottle to move in an upward direction off the surface of said conveyor belt; and second guide means integral with said first guide means having cooperating wall surfaces inclined with respect to the plane of said conveyor belt, for contacting the bottle along its major body portion, causing it to be positioned vertically on said bottle base, as it continues in its course of travel on said conveyor belt.

2. An apparatus as claimed in claim 1, wherein: said first guide means are provided with wall surfaces at an angle of about 30° with respect to the horizontal axis of said conveyor belt.

3. An apparatus as claimed in claim 1, wherein: said first guide means are provided with adjustment means for adjusting said first guide means in a horizontal direction with respect to the longitudinal axis of said belt.

4. An apparatus as claimed in claim 1, wherein: said second guide means are provided with adjustment means for adjusting said second guide means in the vertical and horizontal directions, respectively.

5. An apparatus as claimed in claim 1, wherein: said first guide means are defined by an integral elongated member having two continuous merging surfaces each of which slope at different acute angles with respect to the horizontal axis of said belt.

6. An apparatus as claimed in claim 1, wherein: said first guide means are defined by an integral member having two continuous alternately sloping, generally L-shaped, working surfaces.

7. An apparatus as claimed in claim 1, wherein: said second guide means are defined by an integral member having a pair of working wall surfaces for engaging the major body portion of said bottle; the first of said surfaces being inclined inwardly and downwardly with respect to the longitudinal axis of said belt; the second of such surfaces being parallel to one another inclined to the plane of said belt and continuous with said first surfaces.

8. An apparatus as claimed in claim 7, wherein: the first of said surfaces being inclined in a plane parallel to said conveyor belt forming a generally V-shaped opening to engage the major body portion of said bottle for urging such bottle into a substantially vertical position; said second surfaces having walls parallel to one another and inclined to the plane of said belt defining a channel for the exit of bottles in the erect position.

9. An apparatus as claimed in claim 1, wherein: said second guide means are provided with integrally formed slotted flange means having associated therewith, adjustment means enabling adjustment of said second guide means in accordance with the height of bottles being conveyed.

10. An apparatus as claimed in claim 1, wherein: the rate of movement of said conveyor belt is substantially equal to the rate of feed of said bottles unto said belt.

11. An apparatus as claimed in claim 1, wherein: said conveyor belt is provided with integrally formed spaced cleats defining the position of said bottle with respect to its neighbor, whereby the respective spaces between adjacent cleats are equal to the maximum diameter of the bottle.

12. An apparatus as claimed in claim 1, wherein: said endless conveyor belt is of a width equal to the maximum height of the bottle being conveyed.

* * * * *